May 23, 1972 H. NERWIN 3,664,595

FILM CARTRIDGE

Filed Dec. 8, 1970

HUBERT NERWIN
INVENTOR.

BY

ATTORNEYS

United States Patent Office 3,664,595
Patented May 23, 1972

3,664,595
FILM CARTRIDGE
Hubert Nerwin, Rochester, N.Y., assignor to Eastman Kodak Company, Rochester, N.Y.
Filed Dec. 8, 1970, Ser. No. 96,101
Int. Cl. G03b 1/04
U.S. Cl. 242—71.1
10 Claims

ABSTRACT OF THE DISCLOSURE

A film compartment in a film cartridge is provided with fins at its interior corners for supporting a roll of film by its edges to keep the roll out of contact with the compartment walls, thereby reducing the frictional force resisting displacement of the film.

BACKGROUND OF THE INVENTION

Field of the invention

This invention relates to film cartridges, and in particular to means for reducing the frictional forces resisting displacement of film in a compartment of the cartridge.

Description of the prior art

Film cartridges generally comprise a pair of parallel film compartments located on opposite ends of a film support wall. The compartments each define generally cylindrical interior chambers for holding film in roll form, and passages to the respective chambers are provided adjacent the support wall. Convolutions of film are unrolled from the roll in the supply compartment as the film is withdrawn therefrom by a camera film transport mechanism, and the film is rewound in the take-up compartment of the cartridge after being incrementally seated on the support wall for exposure.

Film in roll form has a strong tendency to "clock-spring," that is, the convolutions tend to unwind to enlarge the diameter of the film roll. This tendency urges the outer convolution of film on a roll into contact with the interior cylindrical wall of the film compartment, and a frictional force (equal to the product of the coefficient of friction of the wall and the component of force normal to the wall, this force being a function of the area of contact of the film and the wall) is created which resists the displacement of the film in a winding or unwinding direction. The clockspringing action of the filmstrip is accentuated whenever the film roll is subjected to vibration. The frictional force is particularly objectionable when film is initially withdrawn from the supply compartment because the clockspringing force is at its maximum and because the roll contains the largest quantity of film. This high initial frictional force makes necessary camera film transport mechanisms which are strong enough to exert the high initial torque necessary to withdraw film from the supply compartment. The torque decreases as the size of the supply roll decreases, but it is still high enough to be objectionable in many instances. A similar frictional force impedes the rewinding of film in the take-up compartment, but the problem is not as severe in that case. Nevertheless, situations can arise where it would be desirable to reduce the frictional force in the take-up compartment as well.

Devices for reducing the clockspring tendency of roll film are not unknown. German Pats. 1,897,840 and 1,916,187, issued respectively on July 30, 1964 and on May 20, 1965, in the name of Agfa Aktiengesellschaft, disclose spring members extending inwardly from the side walls of a 35 mm. film container to engage the surface of the outer convolution of film on a roll to contain the film in a tight roll. Such spring members require separate manufacturing operations apart from the manufacturing of the container, for fabricating the members and for mounting them in the container.

Commonly assigned U.S. Pat. 3,384,318, which issued on May 21, 1968 in the names of Hubert Nerwin and Donald M. Harvey, discloses a film container having inwardly extending flexible fins for engaging lateral portions of the surface of the outer convolution of film in a roll for maintaining the compactness of the roll and for keeping the roll out of contact with the interior side walls of the container. Although quite low, there does exist a frictional force resisting film displacement since these fins engage an area of the filmstrip (the force being a function of the area as indicated above). Moreover, the effectiveness of such fins can be impaired when they ride over the perforated portions of the film.

SUMMARY OF THE INVENTION

An object of the present invention is to reduce the frictional force resisting the displacement of roll film in a film cartridge.

Another object is to reduce the force required to transport roll film in a film cartridge.

A further object is to reduce the force needed to initially withdraw roll film from the supply compartment of a film cartridge.

An additional object is to accomplish the aforementioned objects in an economical manner without impairing the ease with which the film cartridges are used. Other objects will became apparent from the description to follow and from the appended claims.

The above objects are achieved according to a preferred embodiment of the invention by the provision of sets of inwardly extending fins at the corners formed by the junctures of the opposing end walls and the side wall of the supply compartment of a film cartridge. These corner fins extend between end portions of the side wall and adjacent peripheral portions of the end walls, and are adapted to engage only the edges of the outer convolution of the roll of film in the compartment. This engagement keeps the film out of contact with the interior walls of the film compartment to eliminate the frictional force between the walls and the film. Moreover, the frictional force between the fins and the film is minimal due to the small region of contact between the fins and the film. According to one embodiment, the fins are flexible. According to another embodiment, the fins are inclined in a direction for facilitating the unidirectional movement of the film.

BRIEF DESCRIPTION OF THE DRAWINGS

In the preferred embodiments of the invention described below, reference is made to the accompanying drawings, in which.

DESCRIPTION OF PREFERRED EMBODIMENTS OF THE INVENTION

The invention to be described below provides apparatus for facilitating the displacement of roll film in a film container. More specifically, the invention in its preferred embodiment reduces the frictional force impeding the withdrawal of film from the take-up chamber of a film cartridge. This adverse frictional effect is most apparent during the withdrawal of the leading portion of the film from the supply chamber, and the invention substantially reduces the torque required of the film transport mechanism of a camera loaded with the cartridge, for pulling the film from the supply chamber. Therefore, the invention makes possible the use of lighter materials in those members of the camera and cartridge which must sustain the forces which occur when the frictional forces impeding film displacement are overcome. These results are accomplished by the provision of corner fins connecting adjacent portions of the interior side and end walls of a film compartment for supporting a film roll out of contact with the interior walls of the compartment.

Figure 1:
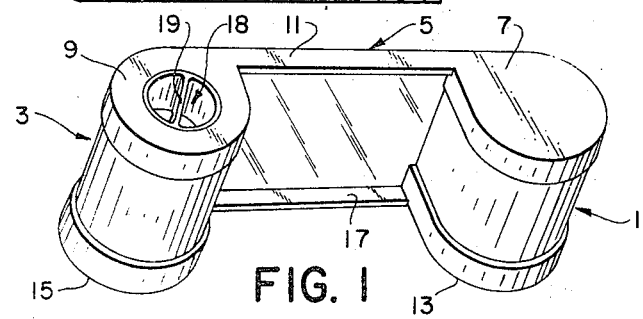
FIG. 1 is an isometric view of a film cartridge to which the present invention relates.

Referring now to the drawings, FIG. 1 shows a film cartridge comprising a supply compartment 1 for housing a roll of unexposed photographic film, a take-up compartment 3 for receiving exposed film and for holding the film in roll form, and a film support wall 5 disposed between the two compartments and adapted to support frames of film in sequence for exposure. The supply and take-up compartments are provided with upper end walls 7 and 9 respectively, and an upper wall 11 is disposed on the upper lateral edge of support wall 5. Walls 7, 9 and 11 can comprise an integral member as shown. Similarly, the two compartments are provided with lower end walls 13 and 15, respectively, which together with a lower wall 17 on the lower lateral edge of support wall 5, can comprise an integral member. The compartments are located in a parallel relationship on opposite ends of support wall 5, and they include passageways (FIGS. 2, 3, 6, and 7) adjacent the opposite ends of support wall 5, through which film enters and leaves the respective compartments. A core 18 is journalled in take-up compartment 3 for rotation about the axis of the compartment, for drawing film into the compartment. Core 18 is rotated upon the application of torque to a radial web 19 at the upper end of core 18 by an appropriate mechanism of a camera in which the cartridge is loaded. As indicated earlier, the torque necessary to rotate core 18 is largely determined by the frictional forces resisting the withdrawal of film from supply compartment 3.

Figure 2:
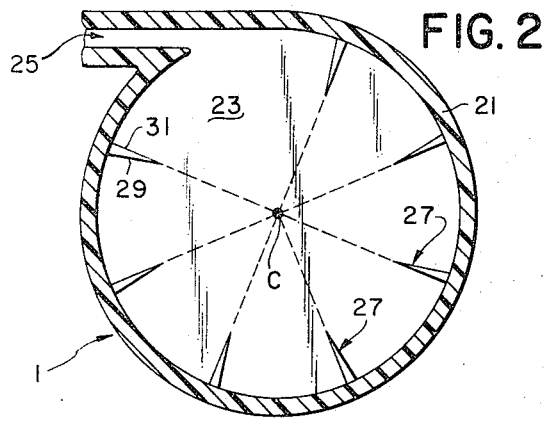
FIG. 2 is a plan, sectional view of a supply compartment incorporating radial corner fins according to the invention.
Figure 3:
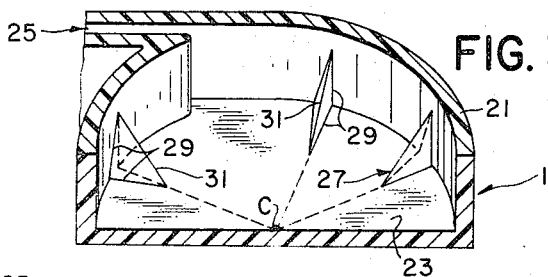
FIG. 3 is an isometric view of a section of the compartment shown in FIG. 2.

According to one embodiment of the invention, radially extending corner fins interconnect end portions of the interior wall of the supply compartment and the peripheral portion of the adjacent end wall. FIGS. 2 and 3 show parts of a film cartridge supply compartment which includes a side wall 21, an end wall 23, and a passageway 25 from which film leaves the compartment to transverse a film support wall. The compartment is substantially cylindrical and has a central axis passing through the center C of the end wall 23. A set of fins 27 are provided at the upper and lower interior corners of the compartment. The fins are structured substantially identically at both ends of the compartment.

Each corner fin 27 has a relatively thick base 29 which is contiguous to the respective walls. The fins 27 are tapered from their bases to relatively thin edges 31. Edges 31 are defined by substantially continuous lines (or curves) and define about a 45° angle with both the end and side walls of the compartment. The fins extend radially towards the center C of the end wall as indicated by the dotted lines which represent the intersection of the central planes of the respective fins with the end wall.

Figure 4:
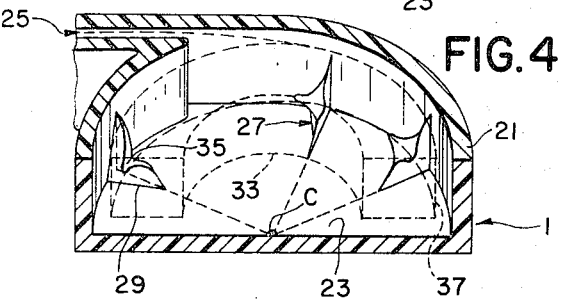
FIG. 4 is a partial isometric view of a section of a supply compartment, and shows the deflection of corner fins in response to withdrawal of film from the supply compartment.
Figure 5:
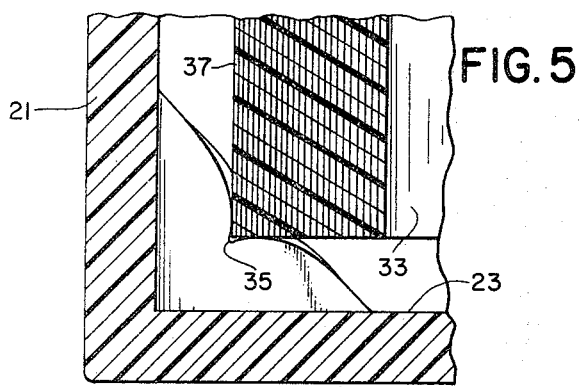
FIG. 5 is a detail sectional view of one of the corner fins depicted in FIG. 4.

The thinness of edge 31 and the inherent resiliency of the plastic material of which fins 27 are formed enable them to flex as shown in FIGS. 4 and 5, as film is withdrawn through passageway 25 from a supply roll 33 (shown in phantom in FIG. 3). The flexing or deflection of fins 27 forms a small groove 35 which facilitates the rotation of roll 33 and the displacement of the outer convolution 37 of the roll through passageway 25.

Figure 6:
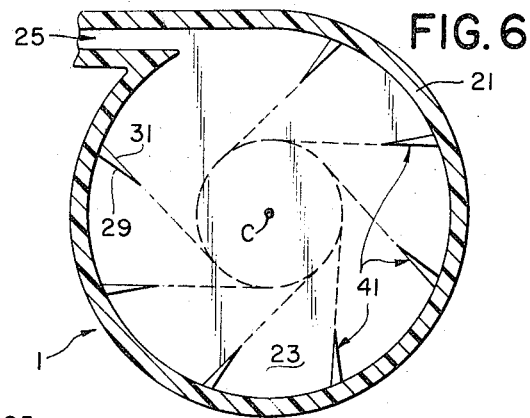
FIG. 6 is a plan sectional view of a supply compartment according to another embodiment of the invention, wherein the fins are inclined to facilitate withdrawal of the film from the compartment.
Figure 7:
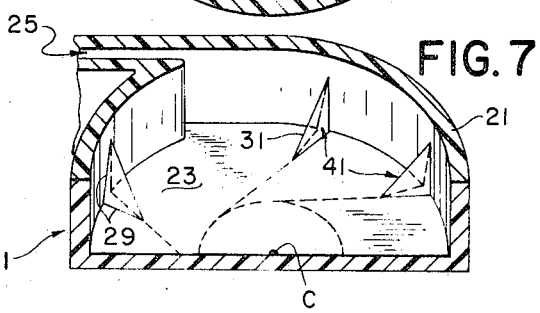
FIG. 7 is an isometric view of a section of the compartment shown in FIG. 6.

An alternate orientation of corner fins according to the invention is illustrated in FIGS. 6 and 7. Shown in these figures is a film supply compartment similar to that described earlier with reference to FIGS. 2–4, and similar parts are therefore marked with like designations. In this case, a set of corner fins 41 are provided having a tapered structure like that of fins 27, but the fins are oriented in the direction of film movement (i.e. in the direction of rotation of the film roll) to aid the withdrawal of film from the compartment. Thus, the dotted lines which represent the intersection of the central plane of fins 41 with end wall 23, are tangent with a circle which is concentric about center point C. The fins are slanted in the direction of rotation of the unwinding roll of film, which would be counterclockwise in the arrangement shown in FIGS. 6 and 7.

When a roll of film 33 is inserted in a supply chamber having radial corner fins 27, it may be necessary to twist the roll in the direction of unwinding upon insertion of the roll, in order to assure the deflection of fins 27 in the direction shown in FIG. 4 to facilitate film withdrawal. Such a twisting movement is not necessary in the embodiment shown in FIGS. 6 and 7 because of the initial inclination of fins 41. Thus, only a straight, axial movement of the roll into the chamber will necessarily deflect fins 41 in the proper direction.

Figure 8:
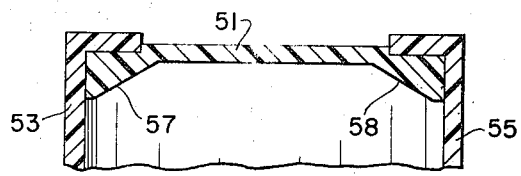
FIGS. 8–10 are partial cross-sectional views of film compartments having corner fins fabricated in three different ways.
Figure 9:
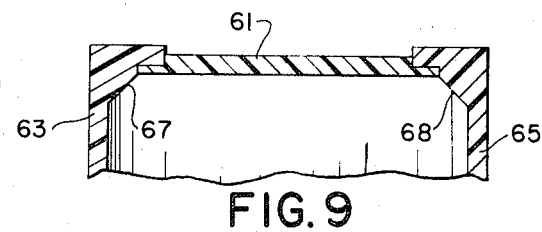
Figure 10:
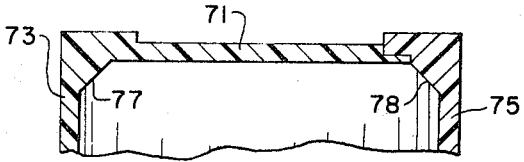

Several modes of incorporating corner fins in a film compartment are shown in FIGS. 8–10. In the arrangement of FIG. 8, the supply compartment of a film cartridge includes a side wall 51 to which a bottom end wall 53 and a top end wall 55 are attached. Lower corner fins 57 and upper corner fins 58 are molded integrally with side wall 51. In the assembly of the compartment, side wall 51 and end wall 53 are initially rigidly attached. Then, the compartment is loaded with a roll of film, and top end wall 55 is put in place and sealed.

Alternatively, the corner fins can be integrally molded with the member forming the side wall. Thus, referring to FIG. 9, a film compartment includes a side wall 61 and bottom and top end walls 63 and 65, respectively. Corner fins 67 and 68 are molded as part of the end walls. To assemble the compartment, bottom end wall 63 and side wall 61 are first rigidly secured. Thereafter, the cartridge is loaded with film, and top end wall 65 is attached in place.

Whereas the compartment wall structure comprised three members in the last two arrangements, two members can be constructed as the assembly components for the compartment. Thus, FIG. 10 shows a side wall 71 and a bottom end wall 73 which have been molded as an integral unit, with lower corner fins 77 formed at the juncture of the walls. An upper end wall 75 is installed after the compartment has been loaded with a roll of film, and wall 75 includes integrally molded upper corner fins 78.

The invention has been described in detail with particular reference to preferred embodiments thereof, but it will be understood that variations and modifications can be effected within the spirit and scope of the invention.

I claim:

1. A container for holding a roll of filmstrip, said container comprising:
    a generally cylindrical side wall having an end portion;
    a generally circular end wall located at said end portion to cap said side wall to define a chamber, said end wall forming a juncture with said side wall;
    a set of corner fins extending inwardly into the chamber at the juncture of said side wall and said end wall, each fin having an edge for engaging a roll of filmstrip in the chamber, and said set of corner fins supporting the roll out of contact with said end wall and said side wall.

2. A container according to claim 1 wherein said chamber has a central axis, and said fins extend radially towards said axis.

3. A container according to claim 1, wherein said container further comprises wall means defining a passageway extending from said chamber and being generally tangent to said chamber so that filmstrip is displaceable through the passageway when the roll is rotated in a first direction; and wherein said fins are inclined to facilitate rotation of the roll in said first direction.

4. A container according to claim 1 wherein said corner fins are flexible.

5. A container according to claim 1 wherein each fin is contoured to taper from a thick portion contiguous said walls to a thin edge.

6. A film cartridge having a film supply compartment for holding a roll of filmstrip, said supply compartment comprising:
   a side wall forming a generally cylindrical unit, said side wall having opposite end portions;
   a pair of end walls disposed at said end portions to form a generally cylindrical chamber for holding the roll of film, said end walls and said side wall forming interior corners at opposite ends of the chamber; and
   sets of corner fins disposed at opposite ends of the chamber and extending inwardly from the corners at the opposite ends of the chamber for engaging the edges of the roll of filmstrip to support the roll out of contact with the walls of the cartridge.

7. A film cartridge according to claim 6 wherein said corner fins are integral with said side wall.

8. A film cartridge according to claim 6 wherein said corner fins are integral with said end walls.

9. A film cartridge according to claim 6 wherein said side wall and one of said end walls comprise an integral unit, and one set of said corner fins is integral with said unit and the other set of said corner fins is integral with said other end wall.

10. In a film cartridge including a supply compartment having walls defining opposite interior ends and a generally cylindrical chamber for holding film in roll form, and a take-up compartment for receiving film from the supply compartment, means for reducing the friction impeding the movement of film out of the supply compartment, said means comprising sets of corner fins disposed at opposite interior ends of the supply compartment for engaging the edges of the film roll to support if out of contact with the walls of the supply compartment.

References Cited

UNITED STATES PATENTS

| 3,009,564 | 11/1961 | Geloso | 206—1 |
| 3,312,338 | 4/1967 | Uterhart | 206—52 F |
| 3,384,318 | 5/1968 | Nerwin et al. | 242—71.1 |

FOREIGN PATENTS

| 1,916,187 | 1/1965 | Germany | 242—71.1 |

LEONARD D. CHRISTIAN, Primary Examiner

U.S. Cl. X.R.

206—52 F